Figure 1:
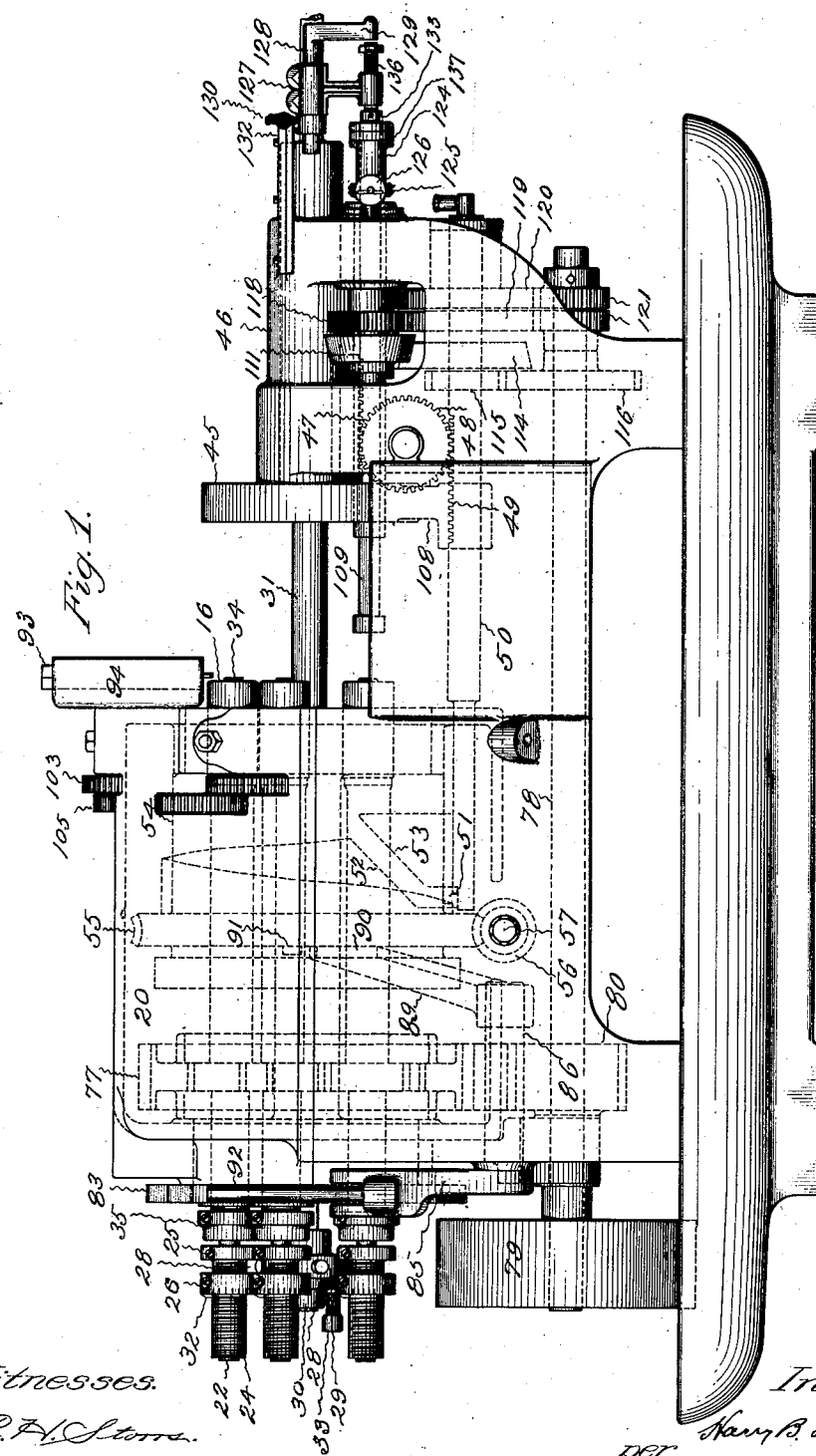

No. 876,814. PATENTED JAN. 14, 1908.
H. B. LESTER.
AUTOMATIC SCREW MACHINE.
APPLICATION FILED JUNE 16, 1905.

6 SHEETS—SHEET 1.

Witnesses.
C. H. Storrs.
Ethel M. Lowe.

Inventor.
Harry B. Lester
per Harry P. Williams
Attorney.

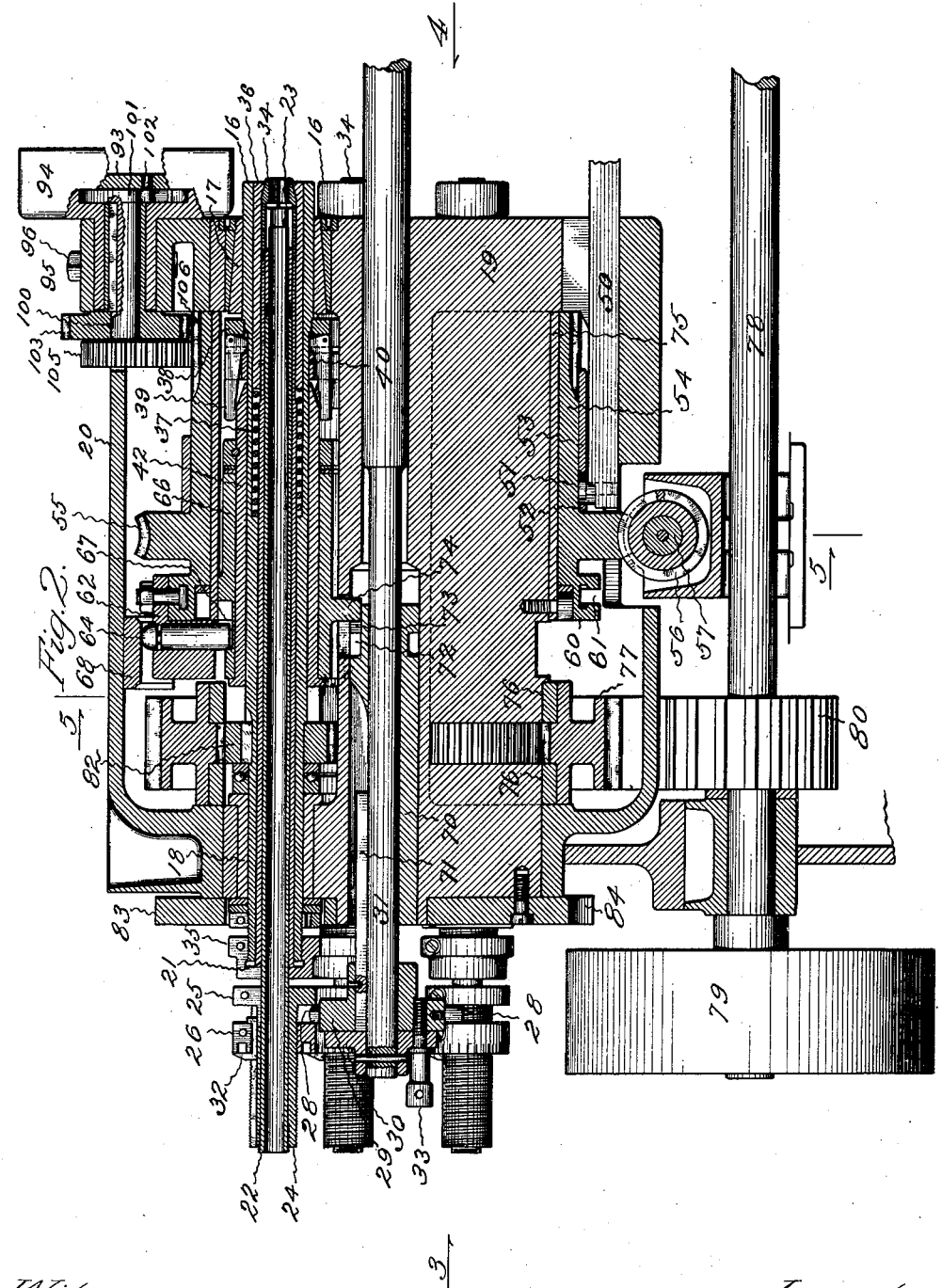

No. 876,814. PATENTED JAN. 14, 1908.
H. B. LESTER.
AUTOMATIC SCREW MACHINE.
APPLICATION FILED JUNE 16, 1905.
6 SHEETS—SHEET 3.
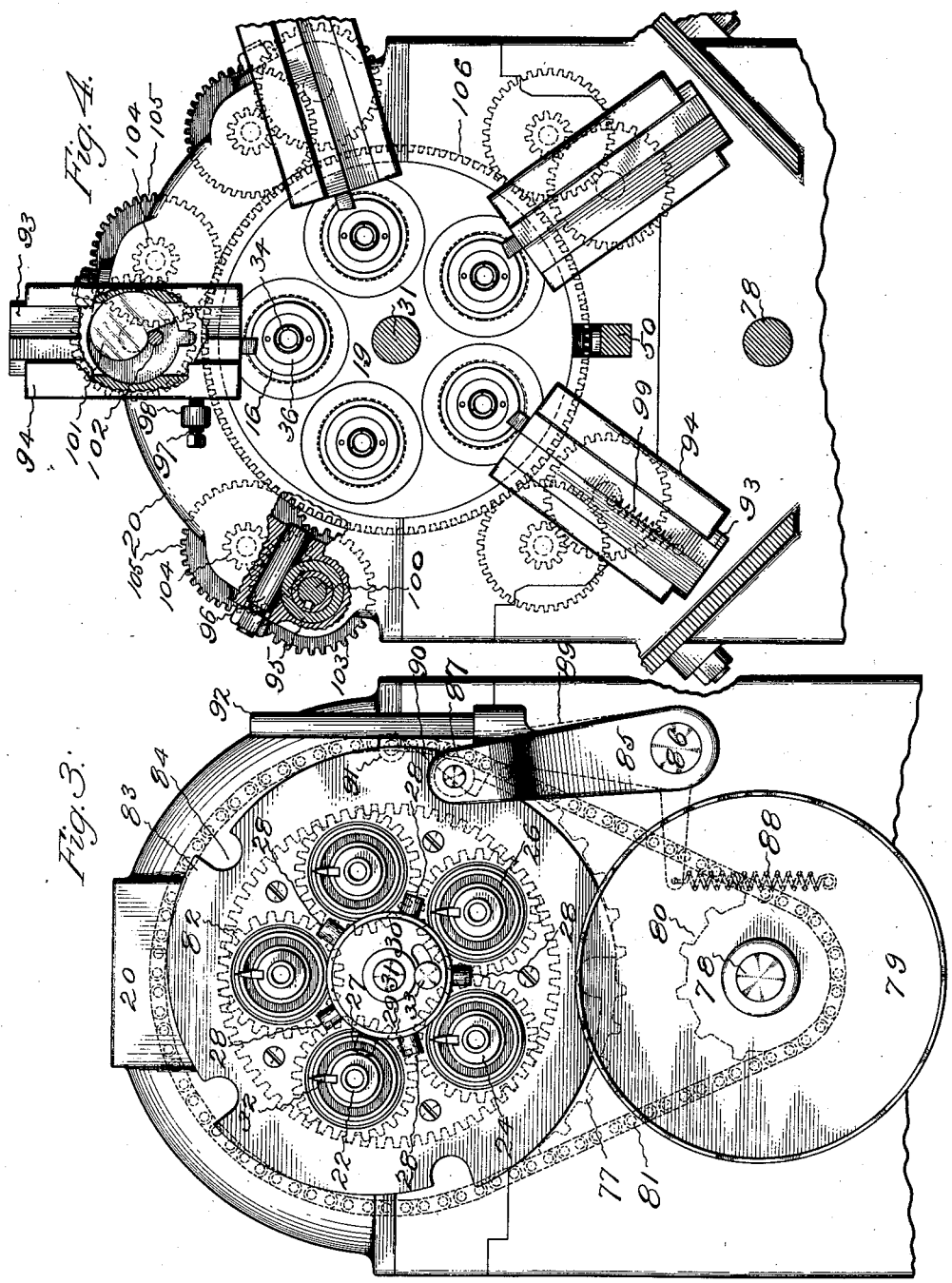
Witnesses.
C. H. Storrs.
Ethel M. Lowe.
Inventor.
Harry B. Lester
per
Harry P. Williams,
Attorney.

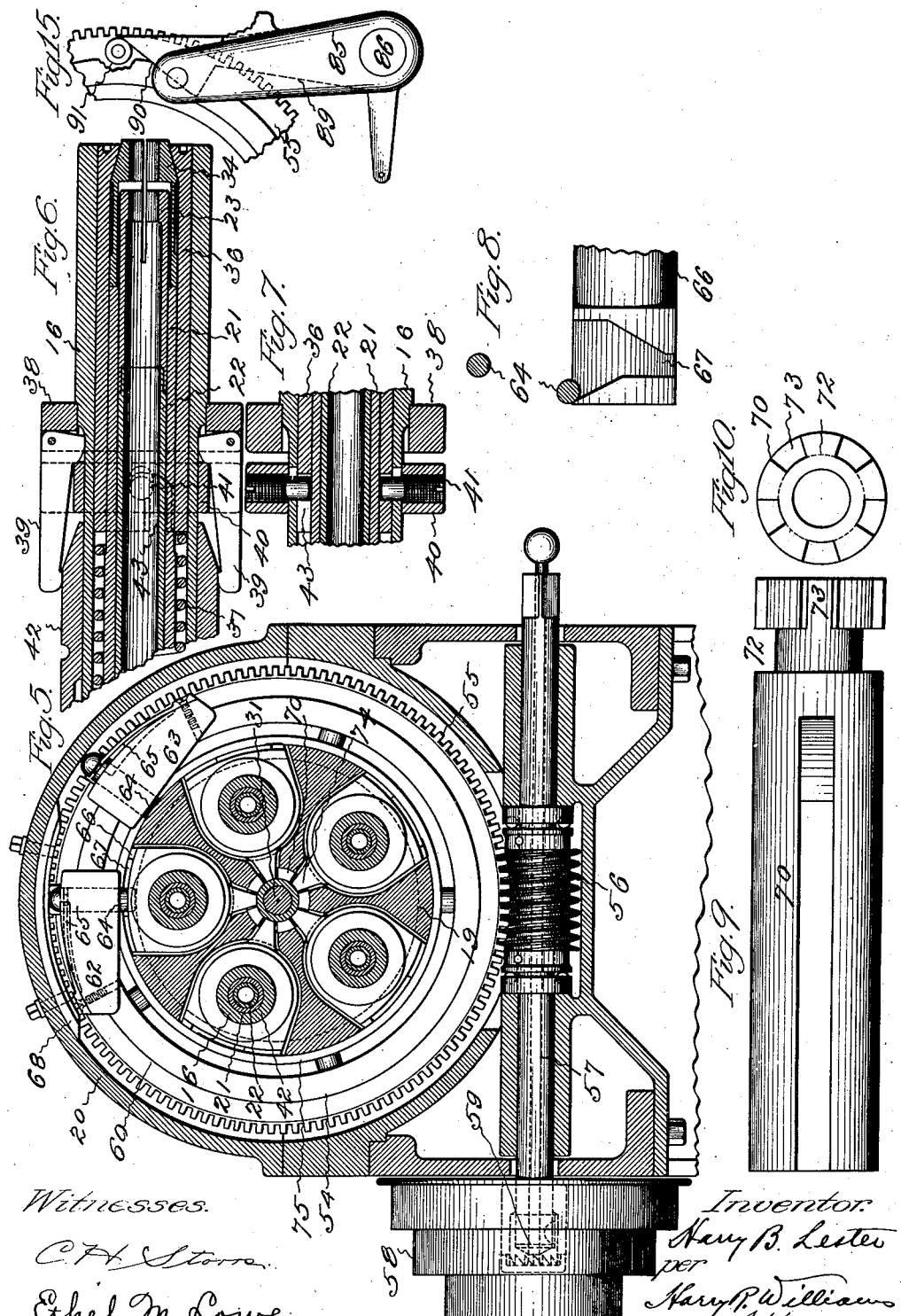

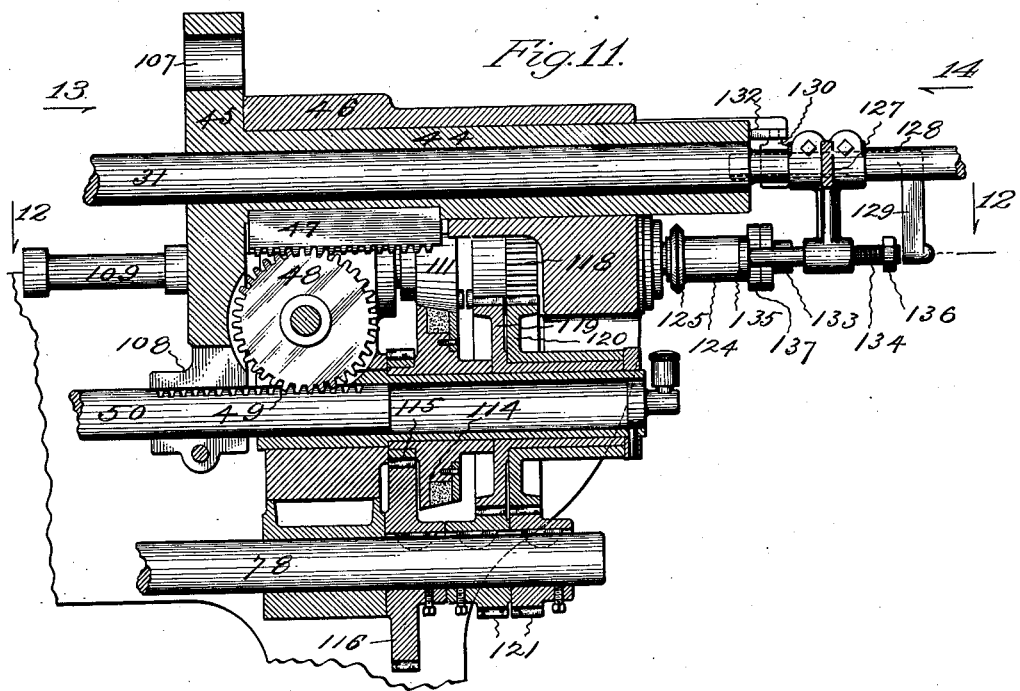

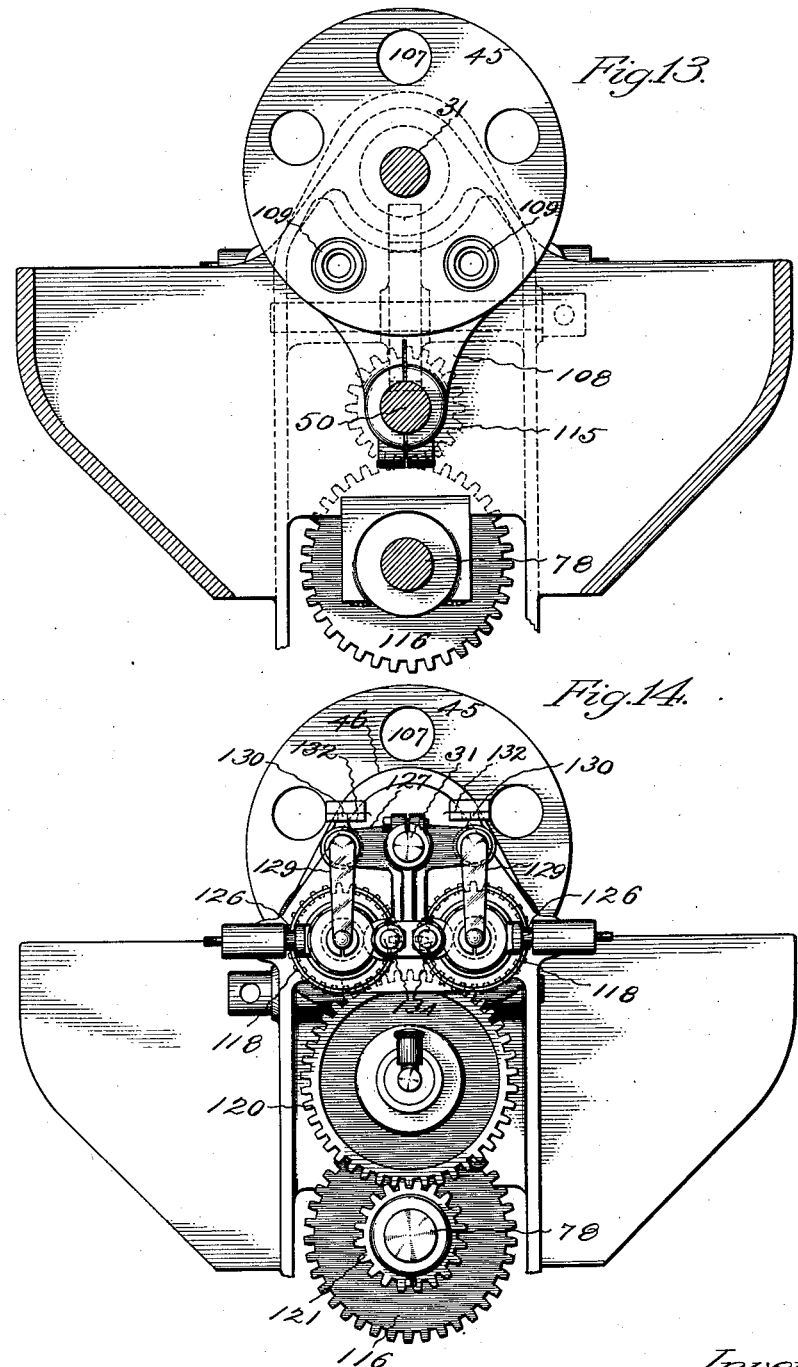

UNITED STATES PATENT OFFICE.

HARRY B. LESTER, OF WEST HARTFORD, CONNECTICUT.

AUTOMATIC SCREW-MACHINE.

No. 876,814.　　　Specification of Letters Patent.　　　Patented Jan. 14, 1908.

Application filed June 16, 1905. Serial No. 265,596.

*To all whom it may concern:*

Be it known that I, HARRY B. LESTER, a citizen of the United States, residing at West Hartford, in the county of Hartford and State of Connecticut, have invented a new and useful Automatic Screw-Machine, of which the following is a specification.

This invention appertains to an automatic screw machine of the multiple tubular spindle type.

The object of the invention is to produce a simple, compact, easily operated screw machine of wide scope and high efficiency having tubular spindles that always rotate in one direction thereby effecting a saving in power, allowing an increase in speed and permitting the use of ordinary right-handed tools, which spindles can be made to feed either simultaneously in order that all of the rods of stock may be operated upon for coincidently producing duplicate pieces or pieces of different lengths, diameters and shapes that require but a simple cut, or to feed progressively in order that the stock may be successively operated upon by a number of different tools which will effect a variety of cuts on each piece.

A further object is to so arrange the mechanisms that they will be above and away from the grit produced by cutting the stock, that the spindle bearings will be widely separated to obviate rocking strains due to rapidly rotating rods, and that all the driving be direct and positive without the interposition of levers, and applied in such manner that the tools are relieved of interfering and distorting strains, thus insuring accurate cuts at a high rate of speed with a minimum expenditure of power.

Figure 1 of the accompanying drawings shows a front elevation of a machine that embodies the invention. Fig. 2 shows a central vertical section of the spindle head. Fig. 3 is a view looking toward the left-hand end of the spindle head, as indicated by the arrow 3 on Fig. 2. Fig. 4 is a view looking toward the right-hand end of the spindle head, as indicated by the arrow 4 on Fig. 2. Fig. 5 shows a vertical transverse section of the spindle head on 5—5 of Fig. 2, looking in the direction indicated by the arrows. Fig. 6 is a sectional view on larger scale of the forward end of one of the spindles. Fig. 7 is a sectional view of a portion of one of the spindles on a plane at right angles to that of Fig. 6. Fig. 8 is a plan of one end of a chuck closing wedge sleeve showing its cam groove and the studs that coöperate to reciprocate this sleeve and effect the closing and opening of the chuck. Fig. 9 shows a plan of the sleeve which is utilized to cause all of the chucks to operate simultaneously. Fig. 10 shows an end view of this sleeve. Fig. 11 shows a central vertical section of the threading tool head. Fig. 12 is a horizontal section through the threading tool head on the plane indicated by 12—12 on Fig. 11, looking in the direction pointed by the arrows. Fig. 13 is a view looking toward the left-hand end of the threading tool head, as indicated by the arrow 13 on Fig. 11. Fig. 14 is a view looking toward the right-hand end of the threading tool head, as indicated by the arrow 14 on Fig. 11. Fig. 15 shows a detail of the spindle head indexing mechanism.

In the machine illustrated there are five rotary and revoluble tubular spindles 16. Each spindle is supported near its forward end by a bushing 17 and near its rear end by a bushing 18 in openings in the forward and rear ends of the skeleton or spider-like spindle head 19 that is rotarily supported in the casing 20 (Figs. 2, 5).

In each spindle is a lining tube 21 and a feed tube 22. The forward end of the feed tube is connected with a split sleeve 23. The jaws of this sleeve are designed to frictionally grasp the stock and feed it forward through the spindle. Screwed upon the rear end of the feed tube is a sleeve 24 which has a flange 25. Screwed upon the threaded outer surface of this sleeve is a collar 26. The inner feed tubes for feeding stock are successively moved forward by the engagement with the flanges 25 of a single roll 27 or simultaneously moved forward by the engagement with the flanges 25 of the five rolls 28, according to the adjustment of the collar 29 bearing the rolls that is adjustably connected with a disk 30 which is fastened to the reciprocatory shaft 31. The exact amount of forward movement of the feed tubes is determined by the adjustment of the flanged sleeves upon the tubes. The feed tubes are drawn back on the stock successively or simultaneously by the engagement with the collars 26 of the roll 27 or the rolls 28, according to the adjustment of the collar 29. The amount of rearward movement of the tubes is determined by the adjustment of the collars on the sleeves.

The peripheries of the collars 26 are preferably graduated and index fingers 32 are arranged on the sleeves so that accurate adjustment may be readily obtained (Figs. 2, 3).

The collar 29 is connected with the disk 30 by a binding screw 33 that extends through a slot in the disk. The five rolls 28 are equally spaced about the roll collar and the single roll 27 is located between two of the other rolls. When the binding screw is loosened the roll collar may be turned so that the single roll 27 will lie between the flange 25 and the collar 26 on the feed tube of each spindle successively as the spindles revolve with the head and reach the locality of the single roll, and then the rolls 28 will be intermediate of the spindles and will not engage with any of the feed tube flanges and collars, or the roll collar may be turned so that the rolls 28 will lie between the feed tube flanges and collars of all of the spindles. In the first instance, when the single roll is between the flange and collar of one spindle the reciprocation of the shaft 31 reciprocates the feed tube of that one spindle only and then only one rod is fed forward. In the second instance, when the collar is turned so that the five rolls lie between the flanges and collars of all of the spindles the reciprocation of the shaft 31 reciprocates the feed tubes of all of the spindles and feeds five rods forward simultaneously (Figs. 2, 3).

The forward end of each lining tube 21 butts against the rear end of a chuck 34 and the rear end of this tube butts against a cap 35 that is screwed upon the rear end of the spindle. By turning the cap the position of the chuck may be adjusted. Between each spindle and chuck is a chuck closing sleeve 36. This sleeve is thrust forward by a spiral spring 37 and when forward the chuck jaws spring open (Figs. 2, 6).

Fastened to each spindle is a collar 38 bearing a pair of angle levers 39. The short arms of these levers engage with a collar 40 that is by screw studs 41 connected with the chuck closing sleeve. The long arms of these levers are adapted to be engaged by the conical wedge 42 that slides back and forth on the spindle. When the wedge is pushed forward the levers are spread and the chuck closing sleeve drawn back so as to cause the chuck to clamp the rod of stock which is in the spindle. When the wedge is drawn back the levers release the clutch closing sleeve allowing the spring to force it forward so that the clutch will unclamp the stock. (Figs. 2, 6, 7).

The movements are so timed that the chucks clamp and hold the rods of stock while the tools are cutting and when the feed tubes are drawn back and only release the stock so that the forward movement of the feed tubes will feed fresh stock.

The openings 43 in the chuck closing sleeve into which project the screw studs 41 that connect the collar 40 with the chuck closing sleeve are made in the form of bayonet slots so that by giving the sleeve a partial rotation it may be drawn out from the spindle leaving the chuck and the split feed sleeve free to be removed if desired for repairs or renewal or changing the size (Figs. 6, 7).

The shaft 31 which, according to the adjustment of the roll collar 29, causes the reciprocation of one or all of the feed tubes extends forwardly through and is fastened to the tubular hub 44 of a tool holder 45 that is movable longitudinally in the casing 46. A rack 47 is fastened to this hub and meshing with this rack is a gear 48 which meshes with a rack 49 on the reciprocatory shaft 50 (Fig. 11). This shaft extends from the casing 46 back into the casing 20 where its end is preferably squared so that the shaft will not rotate. The squared end of the shaft 50 bears a roll 51 that is adapted to be engaged by cam blocks 52 and 53 secured to the cam drum 54 which is loosely mounted on a cylinder 75 that surrounds and is fastened to the spindle head (Figs. 1, 2).

On the cam drum is a worm wheel 55 in mesh with which is a worm 56 on a shaft 57 that extends from front to back and is provided at the back with a driving pulley 58. The shaft 57 is arranged to be connected with the pulley 58 by a clutch 59 (Figs. 2, 5).

When the clutch connects the pulley with the worm shaft the worm will rotate the worm wheel and the cam block on the cam drum that bears the worm wheel will reciprocate the shaft 50 which will in turn oscillate the gear 48 and cause a reciprocation of the tool holder 45 and shaft 31 which, according to the position of the roll collar 29, reciprocates one or all of the feed tubes in the spindles.

Extending around the rear end of the cam drum is a flange 60 in which is a T-shaped groove 61 (Fig. 2), and adjustably fastened to this grooved flange at any desired locality around the cam drum are two blocks 62 and 63 which carry studs 64 that are normally pressed outwardly by springs 65 (Figs. 2, 5).

Mounted on each chuck closing wedge 42 is a sleeve 66 that in the outer face near its rear end has a cam groove 67 (Figs. 2, 5, 8). This sleeve containing the cam groove is mounted on the chuck closing wedge in such manner that when it is moved longitudinally it moves the chuck closing wedge but it does not rotate with the chuck closing wedge which rotates with the spindle.

Fastened to the inside of the casing 20 is a short segmental wedge 68 (Fig. 5). The inner edge of this wedge projects in such manner that it engages the heads of the studs and forces them inwardly against the thrust of the springs when during the rotation of the cam drum the studs pass the wedge. When the studs are thus forced inwardly their inner ends enter the cam groove in the chuck closing wedge sleeve that is beneath them, and by contact with the walls of the cam groove cause the sleeve and chuck closing wedge to be moved backwardly and forwardly for opening and closing the chuck (Figs. 5, 8). The studs spring outwardly when past the wedge and skip the grooves in all the sleeves except that which is for the time being beneath the wedge. By this means the chucks are opened and held open the short time necessary to allow feeding the stock individually in succession as the spindles revolve with the spindle head.

Loose on the shaft 31 in the rear end of the spindle head is a sleeve 70. A feather 71 extends from the roll collar 29 on the shaft 31 into a key-way in the sleeve 70 so that when that collar is turned this sleeve will also be turned. This sleeve, however, is not reciprocated by the shaft 31 (Fig. 2).

Near the front end the sleeve 70 has an annular groove 72 and longitudinal mortises 73 (Figs. 9, 10). A lug 74 extends inwardly from each chuck closing wedge sleeve 66 into the groove 72 in the sleeve 70 (Figs. 2, 5). The mortises in the end of the sleeve are so arranged that when the collar 29 is in such position that the single roll 27 will engage a feed tube flange and collar and reciprocate but one feed tube the lugs will be opposite the mortises and the movement of one chuck closing wedge sleeve will not affect the movement of the others. However, when the collar 29 is so turned that the five rolls 28 engage the feed tube flanges and collars and cause the reciprocation of all of the feed tubes at the same time the sleeve 70 will be so turned that the lugs 74 are not opposite the mortises but opposite the solid end of the sleeve between the mortises. With the sleeve 70 in this position the forward and backward movement of the lug projecting from the chuck closing wedge sleeve that is reciprocated by the cam studs reciprocates the sleeve and by the engagement of the sleeve with all of the lugs causes a reciprocation of all of the chuck closing wedge sleeves and all of the connected chuck wedges, that is, when the collar 29 is set so that the feed tubes feed the stock rods one at a time as they come around the chucks are operated one at a time but when the collar 29 is set so that all of the feed tubes feed rods of stock at the same time, the operation of one chuck operates all of the chucks simultaneously.

Mounted on two bushings 76 that encircle and are fastened to the spindle head near the rear end is a large gear or sprocket wheel 77, and mounted on a shaft 78 that is provided with a driving pulley 79 is a small gear or sprocket wheel 80. These gears may be made to mesh together but it is preferred that they be connected by a sprocket chain 81. The large gear wheel has interior gear teeth and meshing with these are the teeth of the pinions 82 which are keyed to the spindles. The rotation of the large gear wheel through these pinions rotates all of the spindles simultaneously in the same direction and also tends to rotate the spindle head (Figs. 2, 3).

Fastened to the rear end of the spindle head is a disk 83 provided with index notches 84. A lever 85 mounted on a shaft 86 supported by the casing has a roll 87 that is adapted to enter the index notches and lock the index disk. A spring 88 is arranged to hold this lever with the roll against the periphery of the index disk and in a locking notch (Fig. 3). On the inner end of the shaft 86 is an arm 89 that has a wedge 90 on its upper end. Projecting rearwardly from the worm wheel on the cam drum is a stud with a roll 91. This roll is adapted to engage the wedge and rock the arm in such manner as to withdraw the locking roll on the end of the locking lever from a notch in the index plate (Figs. 3, 15).

When the index plate attached to the spindle head is unlocked by the engagement of the roll on the worm wheel with the wedge at the end of the rocker arm, the strain incident to the rotation of the spindles by the engagement of the interior gear with the spindle pinions and also the friction between the interior of the cam drum and the cylinder on which it turns causes the spindle head to rotate in the same direction as the cam drum. This movement of the spindle head continues until the roll on the end of the locking lever enters the next index notch and stops the movement of the spindle head until the cam drum has made a complete revolution and the roll again unlocks the index plate. The pinions meshing with the interior of the large sprocket gear in the manner described tend to rotate the spindle head and they also form a sort of roller bearing for the spindle head so that it rotates easily.

The index locking lever 25 is provided with a handle 92 by means of which the index may be unlocked in order that the spindle head may be rotated by hand when desired Fig. 3). If the machine is set so that all of the feed tubes are to feed simultaneously it is unnecessary to have the spindle head rotated and to prevent the spindle head from rotating the stud and roll 91 may be removed from the worm wheel and then the spindle head remains locked in one position by the index and index locking lever. It is not necessary, however, to withdraw the stud and roll for if the spindle head continues to rotate the feed tubes will be reciprocated simultaneously just the same, only instead of presenting the stock to the same tools each time the stock will be advanced to the next tool.

Any desired character of forming, knurling, cutting off, or the like tools, may be fastened to radially movable slides 93 supported by boxes 94 that are secured to the front end of the casing which surrounds the spindle head. Each of these boxes has a cylindrical hub 95 which extends into an opening in the casing and is held therein by a binding pin 96. A set screw 97 may be screwed through a lug 98 on the casing against the lower side of the box for the purpose of adjusting the tool with relation to the stock and also holding the box so that it will not turn on its hub under the strain due to the rotation of the stock against the tool. Springs 99 are arranged to draw the slides outwardly (Figs. 2, 4).

Extending through the hub of each box is a spindle 100 that on the front end has a cam 101 which engages a stud 102 projecting from the tool slide and on the rear end has a gear 103. Each gear 103 on a cam spindle meshes with a pinion 104 which is connected with a gear 105 which meshes with gear teeth 106 that are cut on the exterior near the front end of the cam drum. The rotation of the cam drum through these gears and cams moves the slides inwardly and feeds the tools radially toward the stock that is fed through and rotated by and revolved with the several tubular spindles (Figs. 2, 4).

The tool holder 45 has holes 107 in which may be secured the shanks of any tools which will produce the desired cut. This holder with these tools is fed toward and from the rotating stock by the reciprocation of the shaft 50 which is occasioned by cams on the cam drum as described. An ear 108 extends downwardly from the tool holder about the shaft 50 for the purpose of guiding and assisting in supporting the holder during its movements (Figs. 11, 13).

Opposite the two lower stock spindles and extending through the two lower holes of the tool holder in the machine illustrated in the drawings are two similar threading tool holders 109. Each of these tap and die holders which are independent of the tool holder is held by and has a longitudinal movement in a tubular spindle 110 that is rotarily mounted in the tool holder supporting frame. Mounted so as to have a slight longitudinal movement on each threading spindle is a friction pulley 111. In the interior of each threading spindle and having a slight longitudinal movement therein is a tube 112 and the friction pulley 111 is fastened to this inner tube by screw pins 113. When the inner tube is pushed forwardly the friction pulley 111 is engaged with a friction pulley 114 that is attached to a pinion 115 which meshes with a gear 116 keyed to the shaft 78 (Figs. 11, 12, 13).

On each spindle 110 is a sleeve 117 and keyed on each sleeve is a pinion 118. Meshing with one of these pinions is a gear 119 and meshing with the other pinion is a gear 120, which gears mesh with two pinions 121 that are keyed to the shaft 78. It is preferred to employ two pinions 121 so that the sizes of the pinions and the intermeshing gears may be varied in order to change the relative rates of rotation of the threading spindles. Projecting from the pinions 118 are clutch studs 122 and projecting from the friction pulleys 111 are clutch studs 123 (Figs. 11, 12, 14).

When the friction pulleys 111 are moved forwardly so as to engage the friction pulleys 114, the threading spindles are rotated rapidly, in fact, more rapidly than the rotation of the stock spindles, by means of the friction pulleys. When the friction pulleys 111 are drawn back and disengaged from the friction pulleys 114 the clutch pins on the friction pulleys 111 engage with the clutch pins on the pinions 118 in such manner that the threading spindles are rotated positively in the same direction but more slowly than when rotated by the friction pulleys, in fact, more slowly than the rotation of the stock spindles. These parts are so designed that the threading spindles always rotate in the same direction as the stock spindles, thus when the threading tools are applied to the stock, if the stock rotates faster than the threading tools, threads will be cut on the stock. However, when the positive drive through the gears is released and the threading spindles are rotated by the friction pulleys the speed of rotation of the threading tools being in the same direction but much faster than the rotation of the stock spindles, the threading tools will be turned off from the threads which they have cut on the stock.

Fastened on the rear end of each threading tube 112 is a spool 124. At one end of each spool is a beveled flange 125. A spring plunger 126 is arranged to press against the opposite sides of this flange in such manner that when the spool is shifted for the purpose of moving the inner tube the movement will be accelerated and the tube will be held in the position to which it is moved. When the spool is drawn back and the plunger is in front of the beveled flange, as shown on the lower spindle in Fig. 12, the friction pulley 111 is disengaged from the friction pulley 114 and the clutch studs are engaged connecting the friction pulley 111 with the pinion 118 so that the threading spindle will be positively rotated by the gearing. When a spool is pushed forward and the spring plunger is behind the beveled flange, as shown on the upper spindle in Fig. 12, the friction pulley 111 is pushed forward disengaging the clutch pins and engaging the friction pulley 111 with the friction pulley 114 so that the threading spindle will be rotated by the friction pulleys.

Clamped to the rear end of the shaft 31 is a T-shaped head 127. Supported by each outer end of the upper portion of this head is a rocker shaft 128 with a downwardly projecting arm 129 and an upwardly projecting lug 130. The lower end of the arm lies in the path of the rear end of the rod 131 that is connected with a threading tool holder 109 and the upper end of the lug extends into an oblique slot in a plate 132 that is attached to the frame (Figs. 11, 12, 14).

As the shaft 31 moves forward the lower ends of the downwardly projecting rocker arms strike the rear ends of the rods 131 just sufficiently to start the threading tools onto the stock. After the threading tools are started onto the stock they follow the threads and move further onto the stock until the threads are completed. The oblique slots guide the lugs on the rocker shafts in such manner that after the arms have started the threading tools the arms turn sidewise so that during their further movement they will not engage with the ends of the rods 131. Nuts 133 are adjustable on the ends of the rods 131. When these nuts engage the rear ends of the inner tubes as the threading tool holders are drawn forward by the threads being cut the inner tubes are pushed forwardly so as to cause a disengagement of the clutches which rotate the threading tools slowly for the purpose of threading the stock, and cause the engagement of the friction pulleys which rotate the threading tools rapidly and cause them to turn off from the stock which they have threaded (Figs. 11, 12, 14). As the threading tool holders are loose in the threading spindles they allow the threading tools to follow the threads without danger of injuring the tools or threads.

Carried by the downwardly projecting arm of the T-shaped frame which is attached to the shaft 31 are rods 134 with heads 135 at one end and threaded nuts 136 at the other end. The heads are adapted to engage flanges 137 on the rear ends of the spools so that as the shaft with the T-shaped head is drawn backwardly the rod heads will engage the flanges and draw the spools and tubes backwardly and cause an engagement of the clutches in such manner that the threading tools will be rotated positively at the threading speed. The nuts are adjusted on the ends of the rods so that the heads will cause the shifting of the parts at the proper time to effect the desired result (Figs. 11, 12). With this arrangement the threading tools can be started on and off the stock at any time for they are moved independently of any of the other cutting tools, in fact, a threading die can be backed off in such manner that another tool can be operating on the stock which is in the threading position, which permits the use of a cutting or forming tool for each spindle, besides the threading tool.

If desired either one or both of the threading tool holders may be removed and other tools may be fastened in the openings in the tool holder through which the threading tool holders extend, or more threading tool holders may be arranged to extend through other openings in the tool holder, and of course the threading tool holders could be used to hold other tools, such as drills or reamers.

If the stock is fed through all of the spindles simultaneously five like pieces, or five pieces of different length, diameter and design can be made at one revolution of the cam drum, and if the stock is fed successively many different operations may be performed on each piece during one revolution of the cam drum.

The invention claimed is:—

1. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, adjustable means for connecting the feed operating mechanism with either one or all of the feeding means, and adjustable mechanism for connecting the clamp operating mechanism with either one or all of the clamping means whereby the feeds and clamps may be operated singly or collectively, substantially as specified.

2. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, and means constructed to connect the feed operating mechanism with either one or all of the feeding means and coincidently connect the clamp operating mechanism with one or all of the clamping means so that when the feeding means are operated singly the clamping means will be operated singly but when the feeding means are operated collectively the clamping means will be operated collectively, substantially as specified.

3. A screw machine having a rotatable spindle head, spindles carried by the head, mechanism that encircles and is mounted directly upon the head and engages the head and the spindles so that it rotates the spindles and also rotates the head both by direct friction and through the spindles, means for feeding a rod through each spindle, means for clamping a rod in each spindle, mechanism for operating the feeding means, mechanism for operating the clamping means, means for connecting the feed-operating mechanism with the feeding means, and means for connecting the clamp operating mechanism with the clamping means, substantially as specified.

4. A screw machine having a rotatable spindle head, mechanism for rotating the head, spindles carried by the head, mechanism for rotating the spindles, feed tubes movable longitudinally in the spindles, mechanism for reciprocating the feed tubes, chucks carried by the spindles, mechanism for closing the chucks, and an adjustable device constructed to in one position connect the feed tube reciprocating mechanism with only one feed tube and to in another position connect the feed tube reciprocating mechanism with all of the feed tubes, substantially as specified.

5. A screw machine having a rotatable spindle head, mechanism for rotating the head, spindles carried by the head, mechanism for rotating the spindles, feed tubes movable longitudinally in the spindles, mechanism for reciprocating the feed tubes, chucks carried by the spindles, mechanism for closing the chucks, and rotarily adjustable and longitudinally movable means which in one position connect the feed tube reciprocating mechanism with and cause the feed of only one feed tube and in another position connect the feed tube reciprocating mechanism with all and cause the simultaneous feed of all the feed tubes, substantially as specified.

6. A screw machine having a rotatable spindle head, mechanism for rotating the head, spindles carried by the head, mechanism for rotating the spindles, feed tubes movable longitudinally in the spindles, mechanism that includes a shaft for reciprocating the feed tubes, chucks carried by the spindles, mechanism for closing the chucks, a collar on said shaft and bearing projections which are adapted to connect the collar with the feed tubes, and a binding screw adjustably connecting the collar with the shaft, substantially as specified.

7. A screw machine having a rotatable spindle head, mechanism for rotating the head, spindles carried by the head, mechanism for rotating the spindles, feed tubes movable longutudinally in the spindles, mechanism for reciprocating the feed tubes, chucks carried by the spindles, mechanism for closing the chucks, mechanism adapted to actuate one chuck closing mechanism, and an adjustable device which in one position permits one chuck closing mechanism to actuate independently, but which in another position connects all of the chuck closing mechanisms so that all of the chucks will operate together, substantially as specified.

8. A screw machine having a rotatable spindle head, mechanism for rotating the head, spindles carried by the head, mechanism for rotating the spindles, feed tubes movable longitudinally in the spindles, mechanism for reciprocating the feed tubes, chucks carried by the spindles, mechanism for closing the chucks, mechanism adapted to actuate one chuck closing mechanism, and rotarily adjustable and longitudinally movable means which when rotated into one position permits the chuck closing mechanisms to operate individually but when rotated into another position is reciprocated by the movement of one chuck closing mechanism and causes the movement of all of the other chuck closing mechanisms, substantially as specified.

9. A screw machine having a rotatable spindle head, mechanism for rotating the head, spindles carried by the head, mechanism for rotating the spindles, feed tubes movable longitudinally in the spindles, mechanism for reciprocating the feed tubes, chucks carried by the spindles, mechanism for closing the chucks, a rotatable and longitudinally movable part which when rotated to one position connects the feed tube reciprocating mechanism with only one feed tube and which when rotated to another position connects the feed tube reciprocating mechanism with all of the feed tubes, and a rotatable and longitudinally movable device connected so as to be rotated by the rotation of the said rotatable and longitudinally movable part and having means which in one position permits the chuck closing mechanisms to be operated independently but which in another position connects all of the chuck closing mechanisms so that all the chucks will operate together, substantially as specified.

10. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, means for connecting the feed operating mechanism with either one or all of the feeding means and for connecting the clamp operating mechanism with either one or all of the clamping means whereby the feeds and clamps may be operated singly or collectively, tool carriers movable toward and from the axes of the spindles, and mechanism for moving the tool carriers, substantially as specified.

11. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, tool carriers movable radially toward the axes of the spindles, and mechanism surrounding the head and connected with and operated by the head rotating mechanism for moving the tool carriers, substantially as specified.

12. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means singly or collectively, mechanism for operating the clamping means singly or collectively, tool carriers movable radially toward and from the axes of the spindles, and mechanism surrounding the head and connected with and operated by the head rotating mechanism for moving the tool carriers, substantially as specified.

13. A screw machine having a rotatable spindle head, means for rotating the head, spindles carried by the head, mechanism for rotating the spindles, means for feeding a rod through each spindle, means for clamping a rod in each spindle, mechanism for operating the feeding means singly or collectively, mechanism for operating the clamping means singly or collectively, tool carriers movable axially of the spindles, and mechanism connected with and operated by the feed operating mechanism for moving the tool carriers, substantially as specified.

14. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, adjustable means for connecting the feed operating mechanism with either one or all of the feeding means and for connecting the clamp operating mechanisms with either one or all of the clamping means, tool carriers movable axially of the spindles, and mechanism connected with and operated by the feed operating mechanism for moving the tool carriers, substantially as specified.

15. A screw machine having a rotatable spindle head, mechanism for rotating the head, spindles carried by the head, mechanism for rotating the spindles, means for feeding a rod through each spindle, means for clamping a rod in each spindle, mechanism for operating the feeding means, mechanism for operating the clamping means, means for connecting the feed operating mechanism with either one or all of the feeding means and for connecting the clamp operating mechanism with either one or all of the clamping means, tool carriers movable radially toward and from the axes of the spindles, mechanism surrounding the head for moving the tool carriers radially, tool carriers movable axially of the spindles, and mechanism connected with and operated by the feed operating mechanism for moving the tool carriers axially, substantially as specified.

16. A screw machine having a rotatable spindle head, spindles carried by the head, means for feeding rods through the spindles, means for clamping rods in the spindles, pinions on the spindles, a gear encircling and in frictional contact with the head and engaging the spindle pinions and adapted to rotate the head by direct friction and also through the pinions, a cam drum encircling and in frictional contact with the head, and cams carried by the cam drum for operating the clamping means, substantially as specified.

17. A screw machine having a rotatable spindle head, spindles carried by the head, means for feeding rods through the spindles, means for clamping rods in the spindles, pinions on the spindles, a gear encircling and in frictional contact with the head and engaging the spindle pinions and adapted to revolve the head by direct friction and also through the pinions, a cam drum encircling and in frictional contact with the head, cams carried by the cam drum for operating the clamping means, tool carriers movable radially toward the axes of the spindles, and mechanism connected with and operated by the cam drum for moving the tool carriers radially, substantially as specified.

18. A screw machine having a rotatable spindle head, spindles carried by the head, means for feeding rods through the spindles, means for clamping rods in the spindles, pinions on the spindles, a gear encircling and in frictional contact with the head and engaging the spindle pinions and adapted to revolve the head by direct friction and also through the pinions, a cam drum encircling and in frictional contact with the head, cams carried by the cam drum for operating the clamping means, tool carriers movable axially toward and from the spindles, and mechanism connected with and operated by the cam drum for moving the tool carriers axially, substantially as specified.

19. A screw machine having a rotatable spindle head, spindles carried by the head, means for feeding stock through the spindles, means for clamping stock in the spindles, mechanism for rotating the spindles, a cam drum encircling the head, mechanism for rotating the cam drum, cams carried by the cam drum for operating the clamping means, tool carriers movable radially toward and from the axes of the spindles, and mechanism connected with and operated by the cam drum for moving the tool carriers radially, substantially as specified.

20. A screw machine having a rotatable spindle head, spindles carried by the head, means for feeding stock through the spindles, means for clamping stock in the spindles, mechanism for rotating the spindles, a cam drum encircling the head, mechanism for rotating the cam drum, cams carried by the cam drum for operating the clamping means, tool carriers movable axially toward and from the spindles, and mechanism connected with and operated by the cam drum for moving the tool carriers axially, substantially as specified.

21. A screw machine having a rotatable spindle head, spindles carried by the head, means for feeding stock through the spindles, means for clamping stock in the spindles, mechanism for rotating the spindles, a cam drum encircling the head, mechanism for rotating the cam drum, cams carried by the cam drum for operating the clamping means, tool carriers movable radially toward and from the axes of the spindles, mechanism connected with and operated by the cam drum for moving the tool carriers radially, tool carriers movable axially toward and from the spindles, and mechanism connected with and operated by the cam drum for moving the tool carriers axially, substantially as specified.

22. A screw machine having a rotatable spindle head, spindles carried by the head, an annular gear encircling the head and rotatable thereon and geared to the spindles and adapted to rotate the head, a cam drum encircling the head, an index disk attached to the head, mechanism for locking the index disk, and means carried by the cam drum for releasing the index locking mechanism, substantially as specified.

23. A screw machine having a rotatable spindle head, spindles carried by the head, means for feeding stock through the spindles, means for clamping stock in the spindles, mechanism for rotating the spindles, mechanism for rotating the head, a cam drum encircling the head, an index disk attached to the head, mechanism for locking the index disk, and means carried by the cam drum for releasing the index locking mechanism, substantially as specified.

24. A screw machine having a rotatable spindle head, spindles carried by the head, means for feeding stock through the spindles, means for clamping stock in the spindles, pinions on the spindles, an annular gear encircling and in frictional contact with the head and engaging the spindle pinions and adapted to rotate the head by direct friction and also through the pinions, an index disk attached to the head, mechanism for locking the index disk, and means for releasing the index disk locking mechanism, substantially as specified.

25. A screw machine having a rotatable spindle head, bearings at each end of the head, spindles supported by the bearings at the ends of the head, means for feeding stock through the spindles, means for clamping stock in the spindles, mechanism for rotating the head, mechanism for rotating the spindles, a cam drum encircling the head, mechanism for rotating the cam drum, and means carried by the cam drum for operating the clamping means, substantially as specified.

26. A screw machine having a rotatable spindle head, bearings at each end of the head, spindles supported by the bearings at the ends of the head, means for feeding rods through the spindles, means for clamping rods in the spindles, mechanism for rotating the head, mechanism for rotating the spindles, a cam drum encircling the head, mechanism for rotating the cam drum, and cams carried by the cam drum for operating the feeding means, substantially as specified.

27. A screw machine having a rotatable spindle head, bearings at each end of the head, spindles supported by the bearings at the ends of the head, means for feeding rods through the spindles, means for clamping rods in the spindles, mechanism for rotating the head, mechanism for rotating the spindles, a cam drum encircling the head, mechanism for rotating the cam drum, and means carried by the cam drum for operating the clamping means and for operating the feeding means, substantially as specified.

28. A screw machine having a rotatable spindle head, spindles carried by the head, mechanism for rotating the head, mechanism for rotating the spindles, means for feeding stock through the spindles, means for clamping stock in the spindles, a drum encircling the head, a gear carried by the drum, mechanism for rotating the gear, tool carriers movable radially toward the axes of the spindles, and gearing connecting the drum and the radially movable tool carriers, substantially as specified.

29. A screw machine having a rotatable spindle head, spindles carried by the head, mechanism for rotating the spindle head, mechanism for rotating the spindles, means for feeding stock through the spindles, means for clamping stock in the spindles, a cam drum encircling the head, a gear carried by the cam drum, mechanism for rotating the drum, tool carriers movable radially toward the axes of the spindles, gearing connecting the cam drum and the radially movable tool carriers, tool carriers movable axially toward the axes of the spindles, and mechanism for moving the tool carriers axially operated from the cam drum, substantially as specified.

30. A screw machine having a rotatable head, spindles carried by the head, mechanism for rotating the head, mechanism for rotating the spindles, means for feeding rods through the spindles, means for clamping rods in the spindles, a cam drum encircling the head, a gear carried by the cam drum, mechanism for rotating the drum, tool carriers movable radially toward the axes of the spindles, a gearing connecting the cam drum and the radially movable tool carriers, tool carriers movable axially toward the spindles, and mechanism operated from the cam drum for moving the tool carriers axially and for operating the feeding means, substantially as specified.

31. A screw machine having a rotatable spindle head, spindles carried by the head, mechanism for rotating the head, mechanism for rotating the spindles, means for feeding rods through the spindles, means for clamping rods in the spindles, a cam drum encircling the head, tool carriers movable axially toward the spindles, and mechanism operated from the cam drum for moving the tool carriers axially and for operating the feeding means, substantially as specified.

32. A screw machine having a rotatable spindle head, spindles carried by the head, mechanism for rotating the head, mechanism for rotating the spindles, a cam drum encircling the head, means for feeding rods through the spindles, mechanism for operating the feeding means, means for clamping rods in the spindles, mechanism for operating the clamping means, and cams carried by the drum for actuating the feed operating mechanism and the clamp operating mechanism, substantially as specified.

33. A screw machine having a rotatable spindle head, spindles carried by the head, an annular gear encircling the head and rotatable relatively thereto, geared to the spindles and adapted to rotate the head, feed tubes in the spindles, chucks carried by the spindles, a drum encircling the head, mechanism for reciprocating the feed tubes, mechanism for closing the chucks, and means carried by the drum for operating the feed tube mechanism and the chuck mechanism, substantially as specified.

34. A screw machine having a rotatable spindle head, spindles carried by the head, an annular gear encircling the head and rotatable relatively thereto, geared to the spindles and adapted to rotate the head, a drum encircling the head, means for feeding rods through the spindles, means for clamping rods in the spindles, mechanism connected with and operated by the drum for operating the feeding means, mechanism connected with and operated by the drum for operating the clamping means, an index disk fastened to the head, mechanism for locking the index disk, and means carried by the drum for releasing the index locking mechanism, substantially as specified.

35. A screw machine having a rotatable spindle head, spindles carried by the head, an annular gear encircling the head and rotatable relatively thereto, geared to the spindles and adapted to rotate the head, a drum encircling the head, means for feeding rods through the spindles, means for clamping rods in the spindles, mechanism connected with and operated by the drum for operating the feeding means, mechanism connected with and operated by the drum for operating the clamping means, an index disk fastened to the head, mechanism for locking the index disk, means carried by the drum for releasing the index locking mechanism, tool carriers movable radially toward the spindles, and gearing connected with and operated by the drum for moving the tool carriers, substantially as specified.

36. A screw machine having a rotatable spindle head, spindles carried by the head, an annular gear encircling the head and rotating relatively thereto, geared to the spindles and adapted to rotate the head, a cam drum, encircling the head, means for feeding rods through the spindles, means for clamping rods in the spindles, mechanism connected with and operated by the cam drum for operating the feeding means, mechanism connected with and operated by the cam drum for operating the clamping means, an index disk fastened to the head, mechanism for locking the index disk, means carried by the drum for releasing the index locking mechanism, tool carriers movable radially toward the axes of the spindles, gearing connected with and operated by the cam drum for moving the tool carriers radially, tool carriers movable axially toward the spindles, and mechanism connected with and operated by the cam drum for moving the tool carriers axially, substantially as specified.

37. A screw machine having a rotatable spindle head, spindles carried by the head, a tube for feeding a rod through each spindle, a chuck for clamping a rod in each spindle, a reciprocating mechanism for moving the feed tubes, and adjustable means movable with the reciprocating mechanism which is adapted to be engaged with and to actuate only one of the feed tubes or to be engaged with and to actuate all of the feed tubes, substantially as specified.

38. A screw machine having a rotatable spindle head, spindles carried by the head, a tube for feeding a rod through each spindle, a chuck for clamping a rod in each spindle, reciprocating mechanism for moving the tubes, and a rotary device movable with the reciprocating mechanism and bearing projections which may be engaged with only one of the feed tubes or which may be engaged with all of the feed tubes, substantially as specified.

39. A screw machine having a rotatable spindle head, spindles carried by the head, a tube for feeding a rod through each spindle, a chuck for clamping a rod in each spindle, an adjustable flanged sleeve on each tube, an adjustable collar on each sleeve, a reciprocatory shaft and a rotary collar angularly adjustable on the shaft and bearing projections which are adapted to be engaged with only one of the feed tube flanges and collars or to be engaged with all of the feed tube flanges and collars, substantially as specified.

40. A screw machine having a rotatable spindle head, spindles carried by the head, a tube for feeding a rod through each spindle, a chuck for clamping a rod in each spindle, a reciprocating tube feed mechanism, mechanism for closing the chucks, adjustable means movable with the tube feeding mechanism, said means when adjusted to one position engaging and actuating only one of the feed tubes and when adjusted to another position engaging and actuating all of the feed tubes, and a device connected with said means so as to move therewith and adapted to connect or disconnect one of the chuck closing mechanisms with the other chuck closing mechanisms, substantially as specified.

41. A screw machine having a rotatable spindle head, spindles carried by the head, a tube for feeding a rod through each spindle, a chuck for clamping a rod in each spindle, a reciprocating tube feeding mechanism, mechanism for closing a chuck, and mechanism which can be adjusted so as to connect the chuck closing mechanism with either one chuck or all of the chucks, substantially as specified.

42. A screw machine having a rotatable spindle head, spindles carried by the head, a tube for feeding a rod through each spindle, a chuck for clamping a rod in each spindle, adjustable mechanism adapted to reciprocate one or all of the feed tubes, and mechanism connected with the tube reciprocating mechanism adapted to close one or all of the chucks, substantially as specified.

43. A screw machine having a rotatable spindle head, spindles carried by the head, means for feeding stock through the spindles, means for clamping stock in the spindles, pinions on the spindles, a gear loosely mounted on and in frictional engagement with the head and engaging the spindle pinions so that when rotated it rotates the head by direct friction and also through the pinions, and rotates the spindles through the pinions, substantially as specified.

44. A screw machine having a rotatable spindle head, bearings at each end of the head, spindles supported near their ends by the bearings at the ends of the spindle head, means for feeding rods through the spindles, means for clamping rods in the spindles, pinions on the spindles between the bearings, and a gear mounted between the bearings and in frictional engagement with the head and engaging the spindle pinions so that when rotated it rotates the head by direct friction also through the pinions and rotates the spindles through the pinions, substantially as specified.

45. A screw machine having a rotatable spindle head, spindles carried by the head, pinions mounted on the spindles, and a gear encircling the spindle head and the pinions on the spindles, said gear being frictionally engaged with the spindle head and geared to the spindles so that by its rotation it positively rotates the spindles and rotates the head by reason of the friction between the gear and the head and between the spindles and the head, substantially as specified.

46. A screw machine having a rotatable spindle head, spindles carried by the head, means for feeding stock through the spindles, means for clamping stock in the spindles, a gear loosely mounted on and in frictional engagement with the head and adapted by its rotation to rotate the spindles and to rotate the head through the spindles and by direct friction between the gear and the head, an index disk fastened to the head, mechanism for locking the index disk, and means for releasing the index disk, substantially as specified.

47. A screw machine having a rotatable spindle head, spindles carried by the head, means for feeding stock through the spindles, means for clamping stock in the spindles, pinions on the spindles, bushings encircling and secured to the head, an internal gear fitting the bushings and meshing with the pinions on the spindles, and means for rotating the internal gear, substantially as specified.

48. A screw machine having a rotatable spindle head, bearings at each end of the head, spindles supported near their ends by the bearings at the end of the spindle head, pinions on the spindles between the bearings, a gear having internal teeth meshing with the pinions, and external teeth, said gear being mounted on and in frictional contact with the periphery of the head between the bearings, a driving gear, and a driving chain encircling the driving gear and the external gear, substantially as specified.

49. A screw machine having a rotatable spindle head, bearings at each end of the head, spindles supported near their ends by the bearings at the ends of the head, means for feeding rods through the spindles, mechanism for operating the feeding means, chucks in the spindles adjacent to the forward bearings for clamping rods in the spindles, mechanism located in the head between the bearings for operating the chucks, and gearing between the bearings for rotating the spindles and rotating the head, substantially as specified.

50. A screw machine having a rotatable spindle head, bearings at each end of the head, spindles supported near their ends by the bearings at the ends of the head, means for feeding rods through the spindles, means for clamping rods in the spindles, mechanism for rotating the spindles, a gear encircling the head between the bearings and in frictional contact with the periphery thereof, a driving pinion below the head, and a connection between the driving pinion below the head and the gear that encircles the head, substantially as specified.

51. A screw machine having a rotatable spindle head, bearings at each end of the head, spindles supported near their ends by the bearings at the ends of the head, means for feeding rods through the spindles, means for clamping rods in the spindles, pinions on the spindles between the bearings, an internal and external gear encircling and in frictional contact with the periphery of the head between the bearings and engaging the pinions, a driving pinion below the head, and a chain connecting the driving pinion and the external gear encircling the head, substantially as specified.

52. A screw machine having a rotatable spindle head, spindles carried by the head, mechanism for rotating the spindles, means for feeding stock through the spindles, means for clamping stock in the spindles, tool carriers movable axially toward the spindles, a cam drum encircling and movable on the periphery of the spindle head and adapted to rotate the head and to feed the tool carriers axially toward the spindles, and mechanism for rotating the cam drum, substantially as specified.

53. A screw machine having a rotatable spindle head, spindles carried by the spindle head, mechanism for rotating the spindles, means for feeding stock through the spindles, means for clamping stock in the spindles, tool carriers movable toward the spindles, a cam drum encircling and in frictional contact with the periphery of the spindle head, mechanism for rotating the cam drum, an index disk fastened to the spindle head, mechanism for locking the index disk, and mechanism operated by the cam drum for moving the tool carriers toward the spindles, substantially as specified.

54. A screw machine having a rotatable spindle head, spindles carried by the head, pinions on the spindles, an internal and external gear encircling and in frictional contact with the periphery of the spindle head each side of the internal gear and meshing with the spindle pinions, and a driving pinion below the spindle head and connected with the external gear, substantially as specified.

55. A screw machine having a rotary spindle head, mechanism for rotating the head, spindles carried by the spindle head, mechanism for rotating the spindles, means for feeding stock through the spindles, means for clamping stock in the spindles, a threading tool holder movable axially of a spindle, mechanism for rotating the threading tool holder in the same direction but slower than the spindles, mechanism for rotating the threading tool holder in the same direction but faster than the spindles, clutches for connecting the rotating mechanisms with the spindles, and mechanisms actuated by the forward movement of the tool holder for automatically shifting the clutches from one tool holder rotating mechanism to the other tool holder rotating mechanism, substantially as specified.

56. A screw machine having a rotary spindle head, mechanism for rotating the head, spindles carried by the spindle head, mechanism for rotating the spindles, means for feeding rods through the spindles, means for clamping rods in the spindles, a threading tool holder movable axially of the spindles, mechanism for rotating the threading tool holder in the same direction but slower than the spindles, mechanism for rotating the threading tool holder in the same direction but faster than the spindles, clutches for connecting the rotating mechanisms with the spindles, and mechanisms actuated by the forward movement of the tool holder and forward of the rod feeding mechanism for automatically shifting the clutches from one tool holder rotating mechanism to the other tool holder rotating mechanism, substantially as specified.

57. A screw machine having a rotatable spindle head, mechanism for rotating the head, spindles carried by the spindle head, mechanism for rotating the spindles, means for feeding rods through the spindles, means for clamping rods in the spindles, a threading tool holder movable axially of a spindle, friction pulleys for rotating the threading tool holder in the same direction but faster than the spindles, and gears for rotating the threading tool holder in the same direction but slower than the spindles, substantially as specified.

58. A screw machine having a rotatable spindle head, mechanism for rotating the head, spindles carried by the head, mechanism for rotating the spindles, means for feeding rods through the spindles, means for clamping rods in the spindles, a threading tool holder movable axially of a spindle, friction pulleys for rotating the threading tool holder in the same direction but faster than the spindles, gears for rotating the threading tool holder in the same direction but slower than the spindles, and mechanism actuated at the limits of the feed and return of the tool holder for automatically shifting the driving mechanism from the gears to the friction pulleys and vice versa, substantially as specified.

59. A screw machine having a rotatable spindle head, mechanism for rotating the head, spindles carried by the head, mechanism for rotating the spindles, means for feeding rods through the spindles, means for clamping rods in the spindles, a threading tool holder movable axially of a spindle, a friction pulley movable on the threading tool holder spindle, means for rotating the friction pulley, a pinion fixed on the threading tool holder, means for rotating the pinion, and mechanism actuated by the forward movement of the tool holder and forward movement of the rod feeding mechanism for automatically connecting and disconnecting the movable friction pulley and the fixed pinion on the threading tool holder, substantially as specified.

60. A screw machine having a spindle head supporting a casing with recesses in its forward end, tool boxes having hubs inserted in said recesses, tool carriers movable in said boxes, a shaft extending through each hub, a cam on one end of each shaft for moving the tool carriers, and gearing at the other end of the shafts for rotating the cams, substantially as specified.

61. A screw machine having a spindle head supporting a casing with recesses in its forward end, tool boxes having hubs inserted in said recesses, tool carriers movable in said boxes, a shaft extending through each hub, a cam on one end of each shaft for moving the tool carriers, and mechanism for rotating the shafts, substantially as specified.

62. A screw machine having a spindle head supporting a casing with recesses in its forward end, tool boxes having cylindrical hubs inserted in said recesses, screw studs butting against the edges of the boxes to prevent them from rotating on their hubs, tool carriers movable in said boxes, a shaft extending through each hub, a cam on one end of each shaft for moving the tool carriers, and gearing at the other end of each shaft for rotating the cams, substantially as specified.

63. A screw machine spindle comprising a tubular spindle, a tubular spindle lining, a chuck at the forward end of the lining, a chuck closing sleeve between the lining and chuck and the spindle, a feed tube movable in the lining, a flanged sleeve adjustable on the rear end of the feed tube, and a collar adjustable on the sleeve, substantially as specified.

64. A screw machine spindle comprising a tubular spindle, a tubular spindle lining, a chuck at the forward end of the lining, a chuck closing sleeve between the lining and chuck and the spindle, a feed tube movable in the lining, a flanged sleeve adjustable on the rear end of the feed tube, a collar bearing graduations adjustable on the sleeve, and a finger arranged to coöperate with the graduations for indicating the adjustment of the collar, substantially as specified.

65. A screw machine spindle comprising a tubular spindle, a tubular spindle lining, a chuck at the forward end of the lining, a feed tube movable in the lining, a chuck closing sleeve between the lining and chuck and the spindle, a collar movable on the spindle, means for moving the collar on the spindle, and studs extending from the collar through the spindle into bayonet slots in the chuck closing sleeve whereby by turning the closing sleeve it can be removed and the chuck drawn out, substantially as specified.

66. A screw machine spindle comprising a tubular spindle, a tubular spindle lining, a chuck at the forward end of the lining, a feed tube movable in the lining, a split friction sleeve at the forward end of the feed tube, a chuck closing sleeve between the lining and chuck and the spindle, a collar movable on the spindle, means for moving the collar on the spindle, and studs extending from the collar through the spindle into bayonet slots in the chuck closing sleeve whereby by turning the closing sleeve it can be removed and the chuck drawn out, substantially as specified.

67. A screw machine having a rotatable spindle head, mechanism for rotating the head, spindles carried by the head, mechanism for rotating the spindles, means for feeding rods through the spindles, mechanism for operating the feeding means, chucks for clamping rods in the spindles, levers for closing the chucks, wedges for operating the levers, sleeves with cam grooves on the wedges, a cam drum encircling the head, mechanism for rotating the cam drum, studs carried by the cam drum and adapted to engage the cam grooves in the sleeves on the chuck closing wedges, and a fixed wedge adapted to engage the studs during a portion of their revolution with the cam drum, substantially as specified.

68. A screw machine having a rotatable spindle head, mechanism for rotating the head, spindles carried by the head, mechanism for rotating the spindles, a tool carrier movable axially of the spindles, means for feeding rods through the spindles, and a shaft extending centrally of the spindle head and the axially movable tool holder and movable with the axially movable tool holder for operating the feeding means, substantially as specified.

69. A screw machine having a rotatable spindle head, mechanism for rotating the head, spindles carried by the head, mechanism for feeding rods through the spindles, mechanism for clamping rods in the spindles, a tool carrier movable axially of the spindles, a rotatable threading tool holder extending through but supported independently of the axially movable tool carrier, means connected with the rod feeding mechanism for starting the threading tool holder forwardly, and means connected with the rod feeding mechanism for moving the threading tool holder backwardly, substantially as specified.

70. A screw machine having a rotatable spindle head, spindles carried by the head, mechanism for rotating the head, mechanism for rotating the spindles, means for clamping work in the spindles, a drum encircling the head, means for rotating the drum, a tool carrier movable radially toward and from the axis of one of the spindles and connections between the drum and tool carrier so arranged as to cause operation of the tool carrier from the drum.

71. A screw machine having a rotatable spindle head, spindles carried by the head, mechanism for rotating the spindles, means for clamping work in the spindles, a tool carrier movable toward and from one of the spindles, a drum encircling and in frictional contact with the periphery of the spindle head, mechanism for rotating the drum, indexing notches on the spindle head, mechanism engaging the notches for locking the head and mechanism operated by the drum for moving the tool carriers, substantially as specified.

HARRY B. LESTER.

Witnesses:
HARRY R. WILLIAMS,
ETHEL M. LOWE.